United States Patent [19]

Yoshida et al.

[11] Patent Number: 4,922,484
[45] Date of Patent: May 1, 1990

[54] ISDN REMOTE SWITCHING UNIT FOR ACCOMMODATING ANALOG AND DIGITAL LINES

[75] Inventors: Yoshinori Yoshida; Akira Arutaki; Masao Hashimoto; Suminori Yoshikawa, all of Tokyo, Japan

[73] Assignee: NEC Corporation, Tokyo, Japan

[21] Appl. No.: 222,595

[22] Filed: Jul. 21, 1988

[30] Foreign Application Priority Data

Jul. 22, 1987 [JP] Japan ............................ 62-181147
Jul. 24, 1987 [JP] Japan ............................ 62-182221
Jul. 24, 1987 [JP] Japan ............................ 62-182222

[51] Int. Cl.⁵ ............................................. H04J 3/12
[52] U.S. Cl. ................................. 370/68.1; 370/110.1
[58] Field of Search ............... 370/56, 58, 60, 110.1, 370/58.1, 58.2, 68.1, 110.2, 110.3

[56] References Cited

U.S. PATENT DOCUMENTS

H586    2/1989  Kun .......................................... 370/92
4,761,779  8/1988  Nara et al. ............................. 360/58

OTHER PUBLICATIONS

M. Yamaguchi, T. Shinozuka, T. Matsumoto, and H. Hisamatsu "ISDN User Access System at the Basic and Primary Rate Interface" pp. 50-67 of NEC Research & Development, Special Issue on "ISDN" 1987.

Primary Examiner—Douglas W. Olms
Assistant Examiner—Melvin Marcelo
Attorney, Agent, or Firm—Helfgott & Karas

[57] ABSTRACT

An ISDN remote switching unit for accommodating analogue telephone subscriber lines and ISDN digital subscriber lines comprises at least one signal converter for each of the conventional analogue subscriber so that a line signal, an address signal and tone signal of each conventional analogue subscriber are converted into a signaling system of the ISDN digital subscribers line, and a traffic concentrator connected to the signal converter and disposed remote from a host exchange station, whereby the signaling system between the remote station and the host station is unified for both the analogue telephone subscriber and the ISDN digital subscriber.

4 Claims, 9 Drawing Sheets

ISDN REMOTE SWITCHING UNIT FOR ACCOMMODATING ANALOG AND DIGITAL LINES

BACKGROUND OF THE INVENTION

The present invention relates to an ISDN remote switching unit for accommodating analog and digital lines and, more particularly, to an ISDN remote switching unit comprising a traffic concentrator switch which is disposed remote from the host exchange station.

The conventional telephone network is constructed mainly for the telephone service, wherein the analogue exchange, such as A-type exchange and cross-bar exchange, is usually used. The so-called non-telephone terminals with slow transmission speed, such as data terminal and facsimile terminal, can be connected to the analogue exchange in addition to the usual various telephone terminals. However, the non-telephone terminals with high transmission speed cannot be connected to it. Recently it is strongly requested to provide the connection of the high speed non-telephone terminals with low cost in the field of, for example, the utilization of the data base by means of the personal computer.

Therefore, the integrated service digital network (ISDN) is proposed, wherein the conventional analogue telephone terminal, various high-speed data terminal, video terminal and digital telephone can be connected together. In the end of 1984, the CCITT (International Telegraph and Telephone Consultative Committee) has recommended the basic access method (CCITT I series recommendation) as a standard for information exchange by way of the digital-analogue conversion between the terminal and host exchange.

In this I series recommendation, the basic access system denoted as 2B+D system with transmission speed 144 Kb/s is proposed, in which the speech signal and the data are transmitted by two B channels with 64 Kb/s speed and the control information is transmitted by a D channel with 16 Kb/s.

The basic construction of the ISDN digital exchange is composed of a line system for exchanging subscriber lines, a signal processing system for transmitting/receiving the signal to/from the subscriber and the interstation signal to/from the confronted exchange, a control system for controlling the connection of the calls and management of the exchange, and a maintenance system for monitoring and testing the exchange. Although the analogue exchange exchanges the analogue signals, such as speech signals, as it is, the digital exchange converts the analogue signal into the digital signal by way of the pulse code modulation (PCM), and then exchanges the digital signals through communication paths composed of the electronic components, such as LSI.

In general, the subscribers for the ISDN digital exchange are not necessarily concentrated in some area. For example, the relatively small number of them may be distributed in a certain area or they may sparsely be scattered in a large area. Therefore, the employment of the digital exchange for these areas is inefficient.

Accordingly, it is preferable that the traffic concentrator switch is separated from the host digital exchange and disposed in the remote area and that its exchange operation is controlled by the distant host exchange. This is called "ISDN remote station control system".

Now, the conventional remote station used by the above ISDN remote switching unit will be explained with reference to FIGS. 1 and 2, which show the remote switching units 105 for analogue subscriber and 120 for digital subscriber, respectively.

Referring to FIG. 1, the remote switching unit 105 for analogue subscriber is composed of the line circuits 107a and 107b for analogue subscribers, a traffic concentrator switch 108, a remote intra-station controller 109 and a terminator 111. The line circuits 107a and 107b comprise the so-called BORSHCT function, where "B" stands for the battery feed, "O" for the over voltage, "R" for the ringing, "S" for supervision, "H" for the hybrid, "C" for the codec and "T" for the testing. The conventional analogue subscriber lines 106a and 106b are terminated by the line circuits 107a and 107b, respectively. The various signals from the analogue subscriber are multiplexed together with the speech signals so as to compose a PCM signal through a semi-fixed path of the traffic concentrator switch 108 and finally transmitted from the terminator 111 to the host station 113 composed of a digital exchange.

On the other hand, as is shown in FIG. 2, the conventional remote switching unit 120 for the digital subscriber is composed of the ISDN line circuits 117a and 117b, a remote control processor 118, a traffic concentrator switch 108 and a terminator 111.

The transmission lines for the ISDN subscribers, such as the digital telephone sets 114a and 114b, and video terminals 115a and 115b, are terminated through the network terminators (NT) 116a and 116b by the line circuits 117a and 117b, respectively. According to the D channel protocol, the layer 3 messages in the D channel subscriber line signal (described in detail in the following) are multiplexed by the processor 118, and then transmitted through the terminators 111 and 112 to the host station 113. Furthermore, the processor 118 constitutes the transmission path of the channel B in the concentrator switch 108 depending on the message content.

As is described above, if both the conventional analogue subscriber line and the ISDN digital subscriber line should be installed together in an ISDN remote switching unit, it is necessary to include both the remote station unit for the analogue subscriber shown in FIG. 1 and that for the digital subscriber shown in FIG. 2. Namely, there is a problem that both the analogue and digital subscribers can not share a remote switching unit.

SUMMARY OF THE INVENTION

An object of the present invention is to provide an ISDN remote switching unit wherein both the conventional analogue telephone subscriber line and the ISDN digital subscriber line can be connected thereto.

An ISDN remote switching unit of the present invention comprises both the analogue subscriber line and the ISDN digital subscriber line, and further comprises converter means either for each of the conventional analogue subscriber, or for the plural number of the conventional analogue subscribers, or as the service trunk of the remote station, whereby the line signal, the address signal and the tone signal of the conventional analogue subscriber are converted into the signaling system of the ISDN digital subscriber line (D channel signaling system), with the result that the signaling systems of the remote station and the host exchange are unified.

BRIEF DESCRIPTION OF THE DRAWINGS

The above and other objects, features and advantages of the present invention may be fully understood from the following detailed description and accompanying drawings, wherein.

In these drawings, the same reference numerals denote the same structural elements, respectively.

DESCRIPTION OF THE PREFERRED EMBODIMENT

Figure 1:
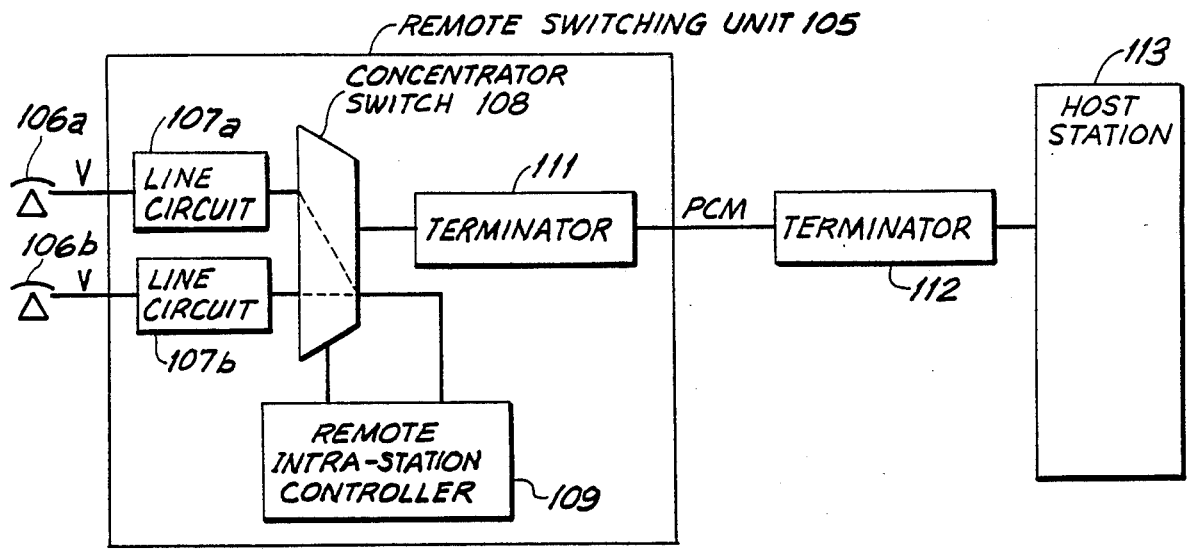
FIG. 1 is a block diagram of the remote switching unit for the conventional analogue telephone subscriber.
Figure 2:
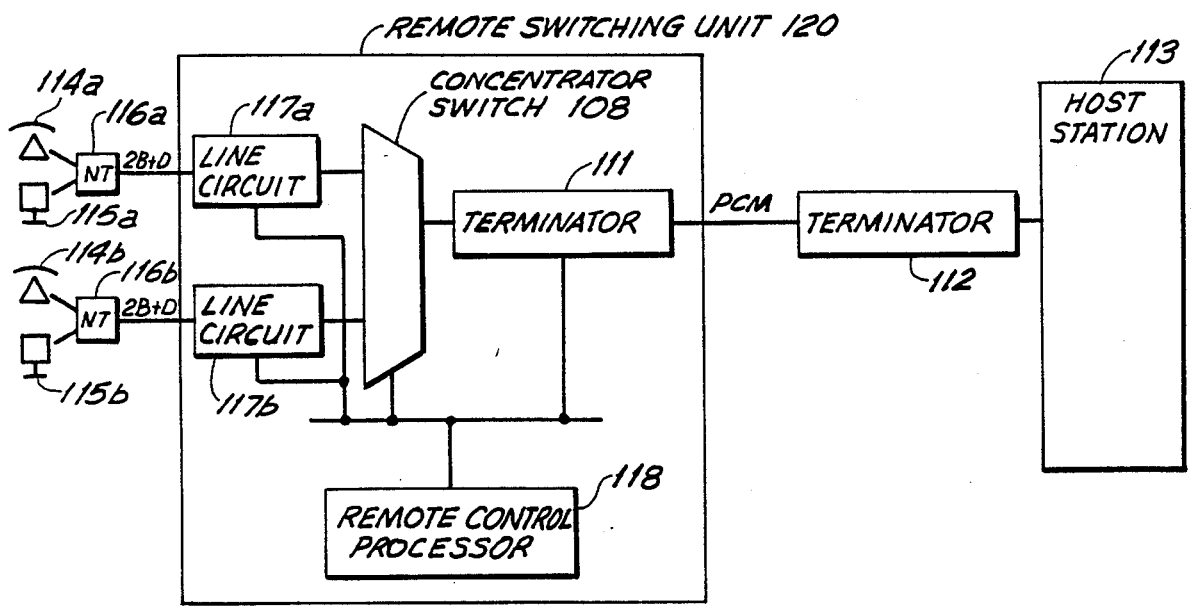
FIG. 2 is a block diagram of the remote switching unit for the conventional ISDN digital subscriber.
Figure 3:
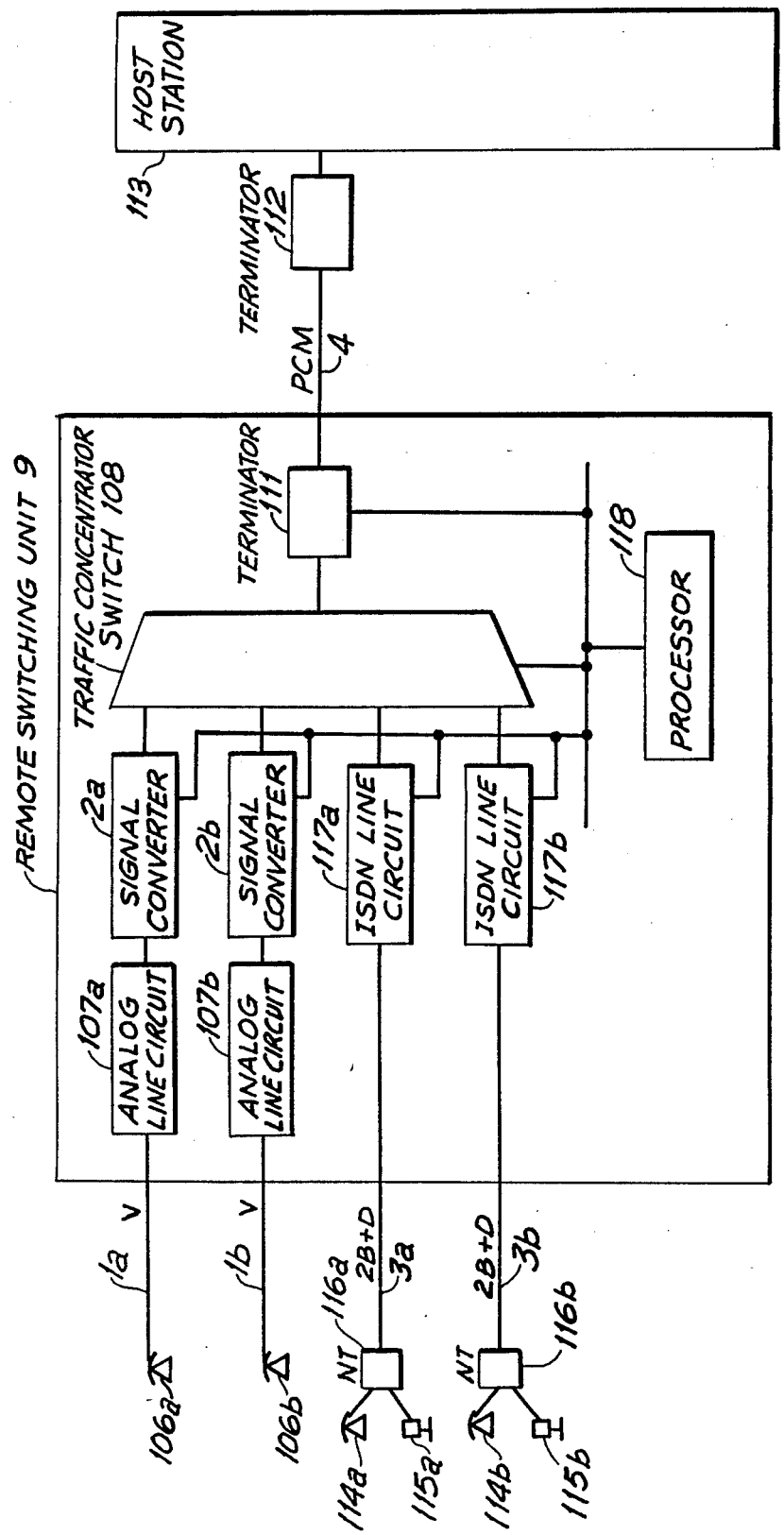
FIG. 3 is a block diagram showing the first preferred embodiment of the present invention.

Referring to FIG. 3, the first preferred embodiment of the present invention comprises a remote switching unit 9 disposed separately from a host station 113 and connected thereto via a terminator 112 and a PCM transmission line 4. The remote switching unit 9 has the analogue line circuits 107a and 107b, which terminate the conventional analogue subscribers 106a and 106b via lines 1a and 1b, respectively. These line circuits 107a and 107b possess the well-known so-called BORSHCT function. Furthermore, the remote switching unit 9 also comprises the ISDN line circuits 117a and 117b, which terminates the ISDN subscribers, such as digital telephones 114a and 114b, and video terminals 115a and 115b, via network terminators 116a and 116b, and via lines 3a and 3b, respectively. The network terminators 116a and 116b possess the function nearly equal to the layer 1 of the OSI model described later. Also, the line circuits 117a and 117b are composed of the digital transmission circuit and the link layer control circuit and possess the termination function of the D channel subscriber line signal. The remote switching unit 9 further comprises a traffic concentrator switch 108, a terminator 111 and a remote control processor 118.

In order to communicate without error, the communication protocol based on which the information must be exchanged should be decided between transmitting and receiving sides. For this purpose, the international standard organization (ISO) proposed the OSI model, in which the level and timing of the electric signals are specified. Although the OSI model divides the protocol into seven layers according to the required functions, the CCITT recommendation concerning the digital subscriber line signal corresponds only to the lower three layers, that is, the physical layer (layer 1), data link layer (layer 2) and network layer (layer 3).

The layer 3 message (the state indication signal and selection control signal) is multiplexed by the remote control processor 118 and supplied to the host station 113 via terminators 111 and 112 along a PCM line 4.

On the other hand, the speech information is transmitted to the host station 113 via traffic concentrator 108 and terminators 111 and 112.

Figure 4:
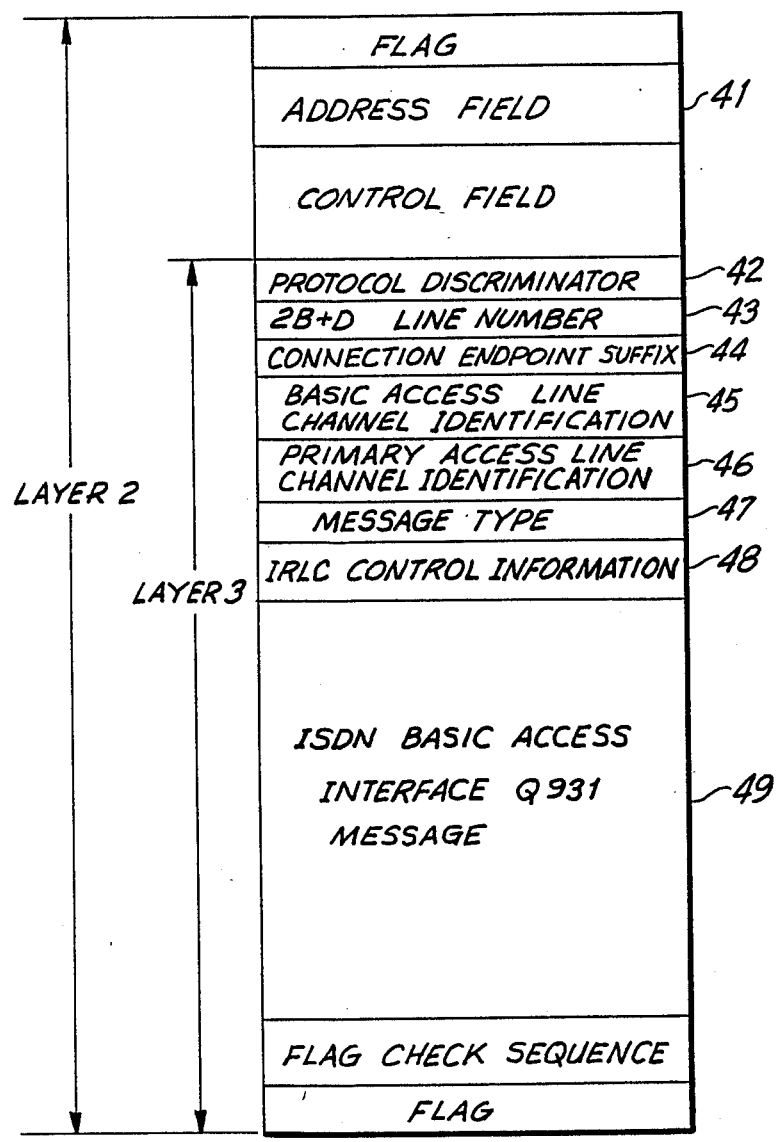
FIG. 4 is a schematic diagram showing the message formats of the second and third layers of the OSI model between the remote switching unit and the host station.
Figure 6:
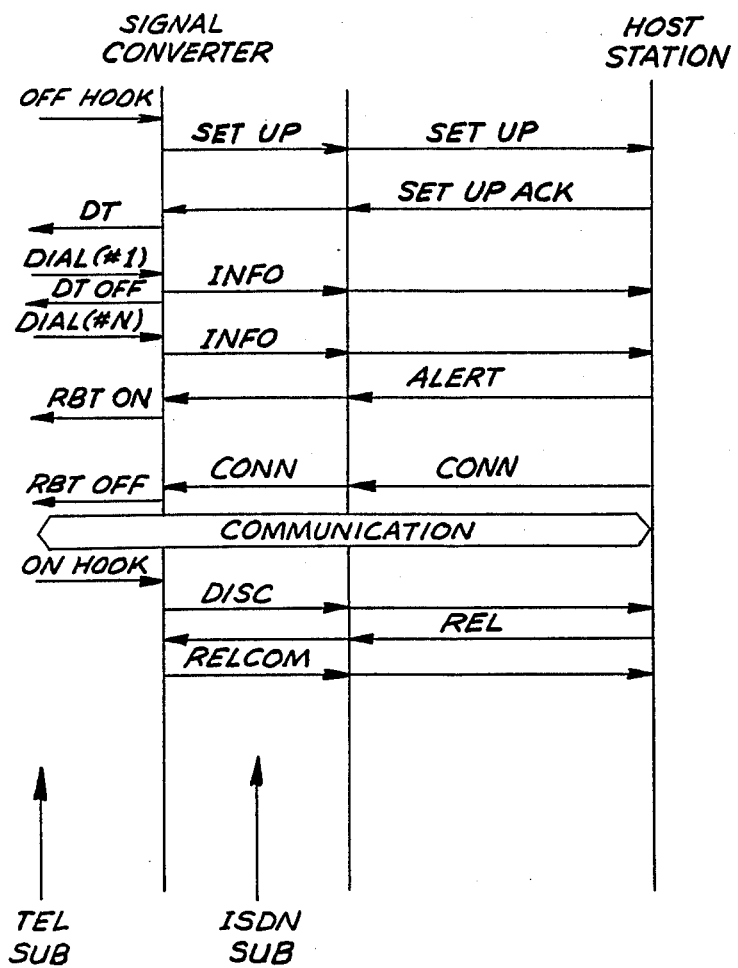
FIG. 6 is a sequence diagram showing an example of the signal conversion according to the present invention.
Figure 7A:
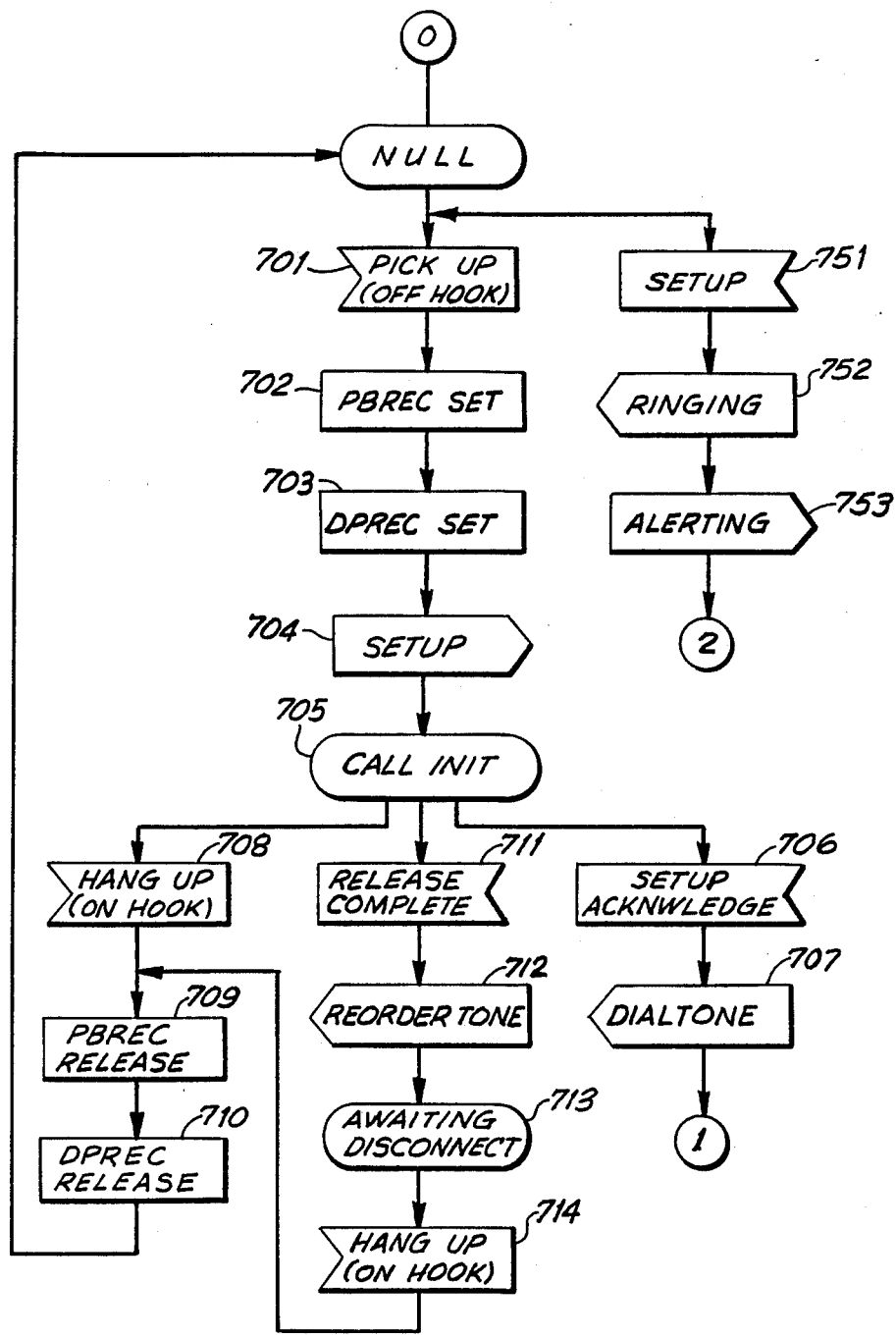
FIGS. 7A and 7B are state transition diagrams of said signal converter means for converting the various signals of the analogue subscriber into the ISDN D channel message.
Figure 7B:
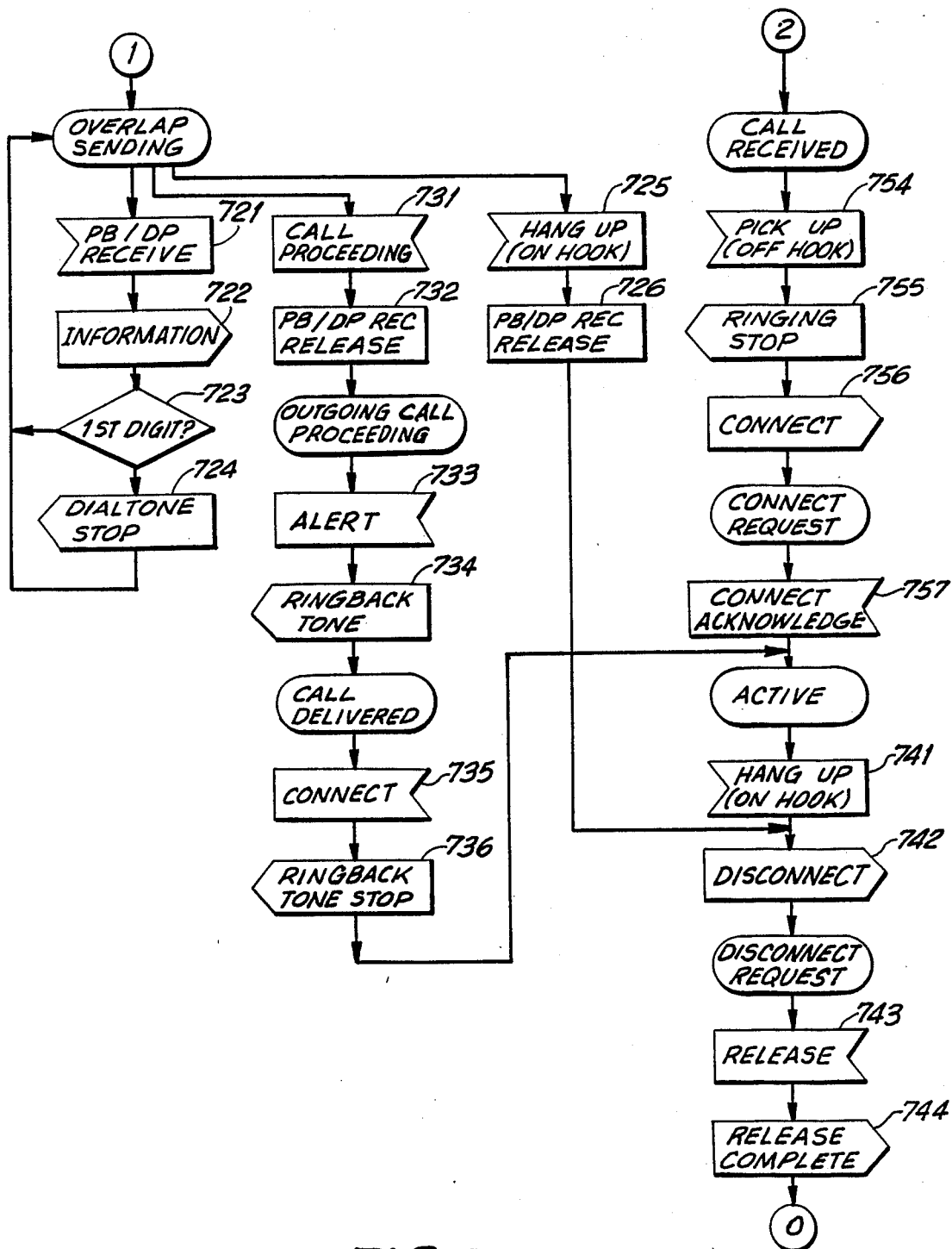

The interface between the unit 9 and the host station 113 obeys the layers 1 and 2 of the I series CCITT recommendations, especially the layer 1 being the primary rate interface. Concerning layer 3, the message format shown in FIG. 4 is employed, in which the D channel on the ISDN subscriber lines are multiplexed by the concentrator switch 108 of the remote switching unit 9.

Now, the message format of layers 2 and 3 will be explained with reference to FIG. 4. Each information on the ISDN 2B+D basic access subscriber lines is converted into the message format between unit 9 and host station 113 shown in FIG. 4.

The service access point identifier (SAPI) on the D channel of the subscriber line, the value of which is allocated to be 0 for the call control procedures, 16 for the packet communication conforming to X.25 level 3 procedures and 63 for layer 2 management procedures, is converted into an address field 41 of the layer 2. Similarly, the terminal endpoint identifier (TEI) on a D channel of the subscriber line is converted into the connection end point suffix 44 (CES), while the I frame information field into the ISDN basic access interface Q931 message 49. Also, the line number and channel number are converted into the 2B+D line number 43 and basic access line channel identification 45, respectively.

The layer 3 message format contains a protocol discriminator 42 at the head of it, and further contains the primary access line channel identification 46. In order to define the information between the remote switching unit 9 and the host station 113, such as setting of the concentrator switch, collection of the traffic information, service order to the subscriber line, the message type 47 and the IRLC control information 48 are assigned in the layer 3 format. The various signals from/to the conventional analogue subscriber shown in FIG. 3 are converted into the unified message format between the remote switching unit and host station 113 shown in FIG. 4, with the result that both the ISDN subscriber line and the conventional analogue subscriber line can be connected together to the host station by way of the unified signaling system.

Now, returning to FIG. 3 the detail of the remote switching unit will further be described. The analogue subscriber lines 1a and 1b are terminated by the line circuits 107a and 107b, the output of which are connected to the concentrator switch 108 via signal converter circuits 2a and 2b provided for each of the line circuits. The signal converter circuits 2a and 2b convert the various signals of the analogue subscribers 106a and 106b (on and off of the direct current, off-hook signal, on-hook signal, dial pulses, multi-frequency signal (PB signal) and audible signals, such as dial tone and ringback tone) into tho D channel protocol message. The converted message is multiplexed with the D channel message of the ISDN digital subscribers by means of the processor 118, and then transmitted to the host station 113.

Figure 5:
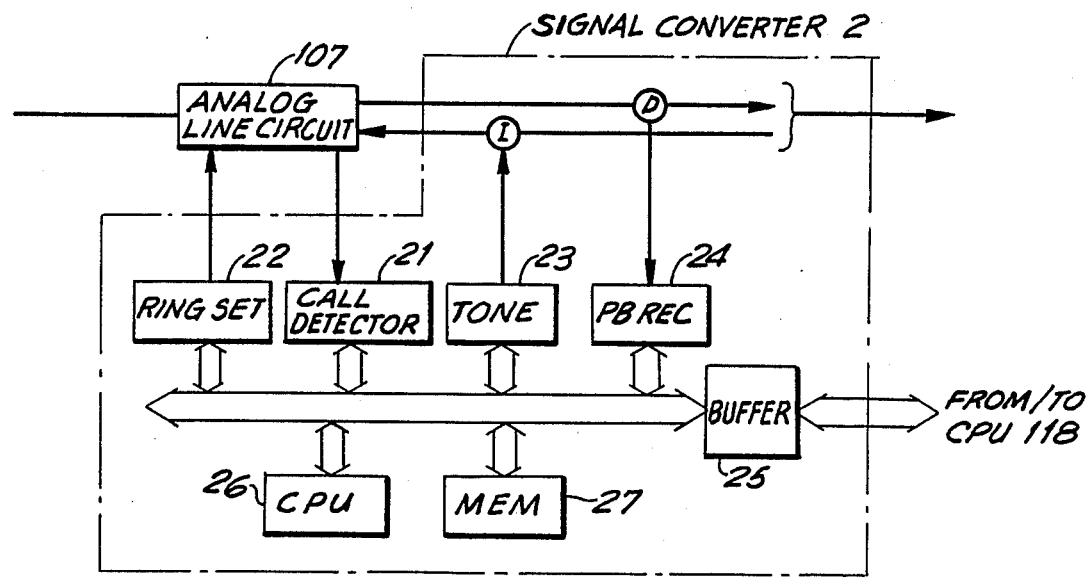
FIG. 5 is a block diagram showing an example of the signal converter means applied to said first embodiment.

In order to simplify the explanation, the reference numerals 1, 2, 3, 106, 107, 113, 114, 115, 116 and 117 in the following denote either of the two corresponding elements with the postfixes a and b. Referring to FIG. 5, the signal converter circuit 2 comprises a call detector 21, a ringing setter 22 (RING SET) for transmitting and halting the ringing, a tone circuit 23 (TONE) for transmitting an audible signal, a PB receiver 24 (PB REC) for detecting the selection signal (PB/DTMF), a communication buffer 25 (BUFFER) for communicating with the processor 118 of the remote switching unit 9, a processor 26 (CPU) for controlling the above circuits and for converting the various signals from analogue subscriber into ISDN subscriber D channel signal, and a memory 27 (MEM).

Now, referring to FIGS. 5, 6, 7A and 7B, the connection sequence performed by the signal converter circuit 2 will be explained.

At first the off-hook of the analogue telephone subscriber results in constituting the direct current loop, which is detected as a call by the analogue telephone line circuit 107. Then, the call-detector 21 of the signal converter circuit 2 performs the call detection (step 701). The PB receiver 24 and the call-detector 21 are set to receive the PB and DP signals as address signal (steps 702 and 703). The DP signal is the number of the calls detected by the call detector 21, which is counted by the CPU 26. After that, the CPU 26 sends the SETUP report to the processor 118 (step 704) and enters into the call initiation ready state (step 705). The processor 118 of the remote switching unit 9 transmits the SETUP message (the call initiation message in the form of the D channel signaling system) to the host station 113.

Upon receiving the call initiation receiving message (SETUP ACK) in the form of the D channel signaling system from the host station 113, the tone circuit 23 supplies the subscriber with a dial tone (DT) (step 707). If the call detector 21 detects that the subscriber makes on-hook under the call initiation ready state (step 708), the PB receiver 24 ready for receiving the address signals returns to the initial state by resetting the PB REC SET and DP REC SET states (steps 709 and 710). Also, if the host station sends the release message to the unit 9 (step 711), the tone circuit 23 transmits the subscriber with busy tone (step 712) and the call detector 21 monitors the on-hook of the subscriber (step 713). If the on-hook of the subscriber is detected by the call detector 21 (step 714), the forementioned steps 709 and 710 are performed to return the PB receiver 24 to the initial state.

Now, the explanation will be returned to the forementioned step 707. After the dial tone from the signal converter circuit 2 is received, the subscriber terminal sends the address signal. Upon receiving the address signal (step 721), the signal converter circuit 2 sends the numeral of its as an information message of the D channel signaling to the host station 113 by means of the processor 118 (step 722) and judges whether the numeral is the first one or not (step 723). If so, it suspends the transmission of the dial tone (step 724). Then, the following numerals are transmitted. If the subscriber halts to send the address and makes on-hook (step 725), the PB receiver 24 and the call detector 21 are reset (step 726) and the disconnection procedure described later is performed. If the CPU 26 of the signal converter circuit 2 receives the call proceeding signal from the processor 118 (step 731), it resets the PB receiver 24 and call detector 21 for receiving the address signal (step 732) and proceeds to the outgoing call procedure.

The host station 113 returns back an ALERT message to the remote switching unit 9 after receiving a series of the numerals. Upon receiving the ALERT message (step 733), the tone circuit 23 of the unit 9 sends the ring back tone (RBT) to the subscriber (step 734).

When the host station 113 receives the response from the called subscriber, it sends the connection (CONN) message to the remote switching unit 9. When the signal converter 2 receives the CONN message (step 735), it halts to send the ring back tone (step 736), and request to connect the traffic concentrator switch 108 to the processor 118 via CPU 26, with the result that the transmission path is constituted, that is, the communication between subscribers becomes possible.

When the communication terminates, the analogue subscriber makes on-hook, so that the direct current loop is disconnected. When this disconnection is detected by the call detector 21 (step 741), the CPU 26 sends the DISC request, that is, the disconnection message of the D channel message, to the host station 113 from the processor 118 (step 742).

In response to the DISC request, the host station 113 returns the release message (REL) to the remote switching unit 9 according to the disconnection procedure of the D channel protocol. Upon receiving this release message (step 743), the signal converter circuit 2 of the remote switching unit 9 transmits the release complete (RELCOM) message, that is, the acknowledge signal to the release message, to the host station 113 (step 744). Thus, the sequence of the connection of the outgoing call becomes complete.

Next, the sequence of the connection of the receiving call will be explained.

When the SETUP message from the call initiation station is received by the signal converter circuit 2, it activates a ring setter 22 to send a ringing to the subscriber (step 752) and also sends the ALERT message to the host station 113 (step 753). If the subscriber makes off-hook, the call detector 21 identifies the subscriber response (step 754), so that it makes the ring setter 22 stop to send the ringing (step 755). The signal converter circuit 2 transmits the CONN message to the host station (step 756), which in turn sends back the connection acknowledge message (CONN ACK) (step 757). The procedure after the connection becomes complete is similar to the above steps 741 to 744. Therefore, the explanation will be omitted.

The above explanation is concerned with the connection sequence of the conventional analogue subscribers 106a and 106b. On the other hand, the signal exchange between the remote switching unit and the host station in the connection sequence of the ISDN digital subscribers 114a, 114b, 115a and 115b is similar to that of analogue subscribers except that the signal converter circuit in FIG. 3 is replaced by the digital line circuit. The signal exchange between the ISDN digital subscriber and the digital line circuit obeys the I series recommendation of the CCITT.

Figure 8:
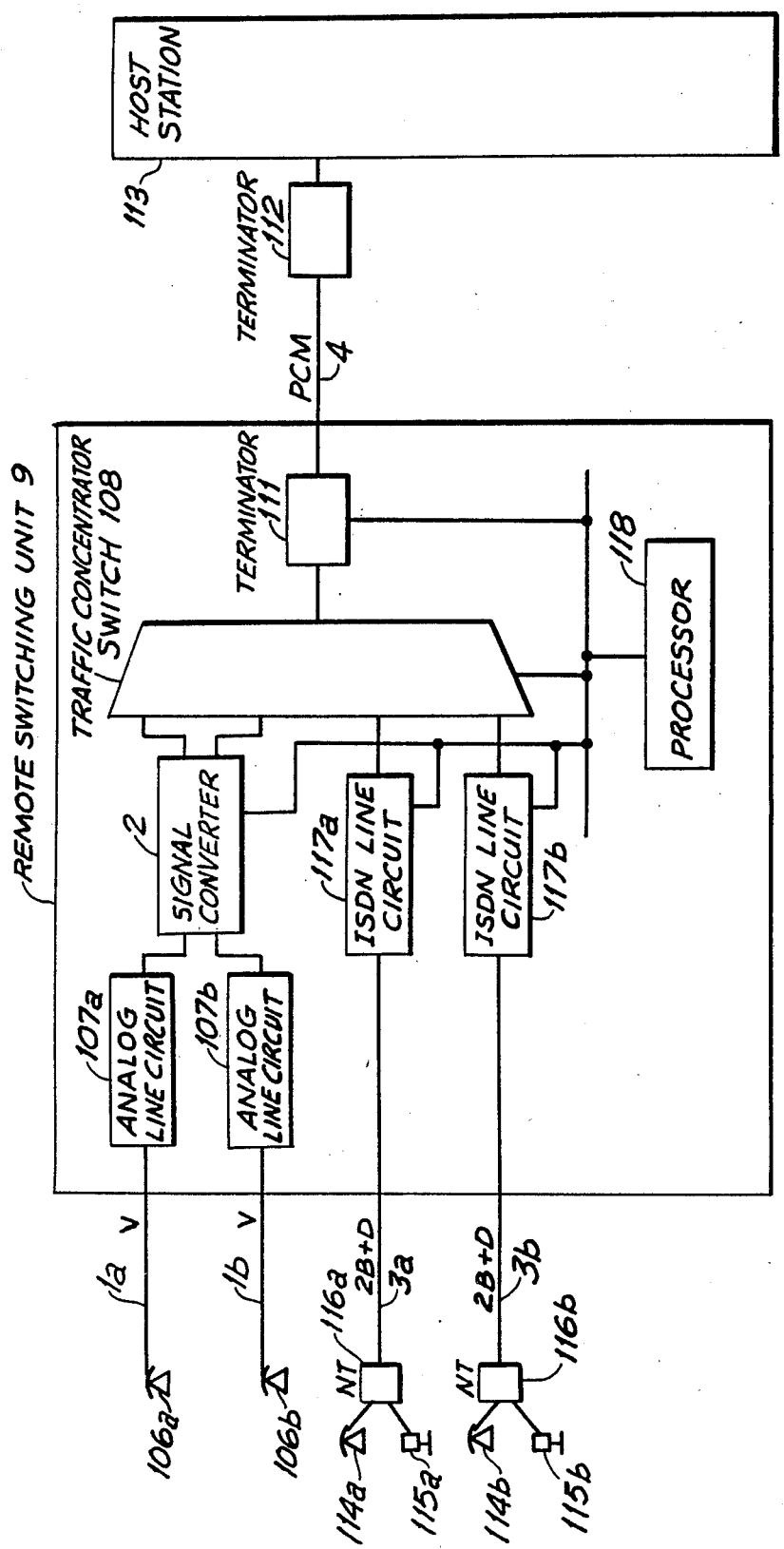
FIG. 8 is a block diagram showing the second embodiment of the invention.

Referring to FIG. 8, which shows the second preferred embodiment of the present invention, the signals from the analogue telephone subscriber terminals 106a and 106b are terminated by the analogue telephone line circuits 107a and 107b, respectively, which are further connected to a signal converter circuit 2. The inputs of a concentrator switch 108 are the plural line circuits 107a and 107b. The signal converter circuit 2 converts the various signals from the analogue telephone subscriber (on and off of the direct current, off- and on-hook signals, dial pulses, multi-frequency signal (PB), dial tone and ring back tone) into the D channel protocol. The converted message is multiplexed with the D channel signal message of the ISDN digital subscriber, according to the message format shown in FIG. 4, and then transmitted to the host station 113.

Figure 9:
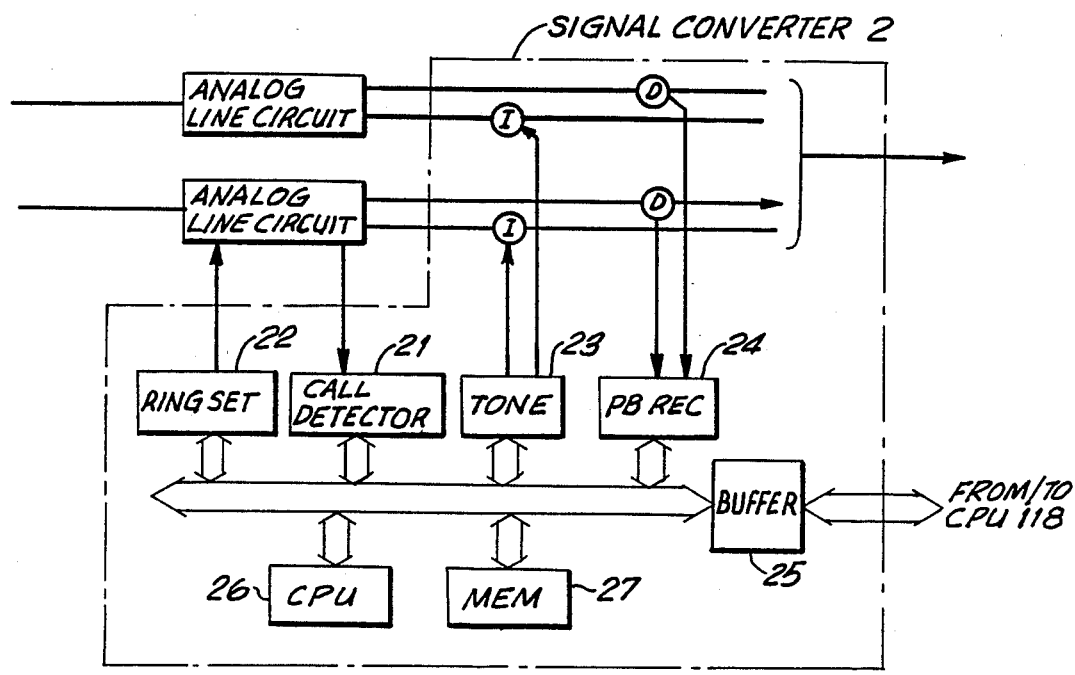
FIG. 9 is a block diagram showing a preferred embodiment of the signal converter means applied to said second embodiment.

Referring to FIG. 9, it is shown that the signal converter circuit 2 comprises essentially the same constituent elements as is shown in FIG. 5. The constructional difference from those in FIG. 5 is that the call detector 21, ring setter 22, tone circuit 23 and the PB receiver 24 are respectively connected to the line circuit, droppers D and inserters I.

Figure 10:
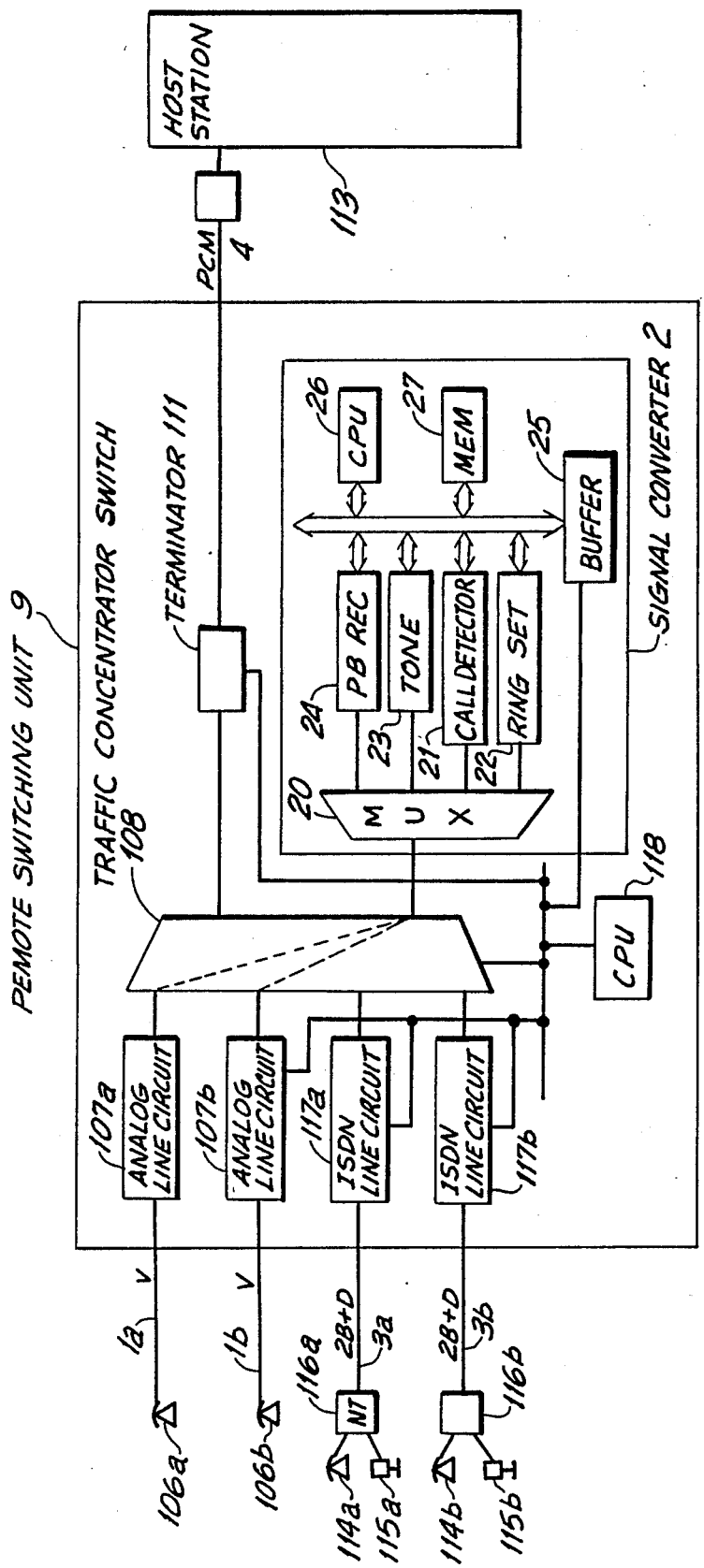
FIG. 10 is a block diagram showing the third preferred embodiment of the present invention.

Now, referring to FIG. 10, which shows the third preferred embodiment of the present invention, the analogue telephone subscriber terminals 106a and 106b are terminated by the analogue telephone line circuits 107a and 107b and then connected to a signal converter circuit 2 as service trunk through a traffic concentrator switch 108. In the signal converter circuit 2 the various signals from the analogue telephone subscriber are applied through semi-fixed path in the concentrator switch 108 and through a multiplexer 20 (MUX) to the corresponding processing means. In other words, they are connected to the call detector 21 for detecting the on and off of the direct current, off-hook signal, on-hook signal, dial pulses, a ring setter 22 for generating the ring back tone, a tone circuit 23 for generating the audible signal, such as dial tone, and a PB signal receiver 24. The other constituent elements and their operation are similar to the first embodiment. Therefore, the explanation will be omitted.

What is claimed is:

1. An ISDN remote switching unit accommodating analog telephone subscribers and ISDN digital subscribers and disposed separately from a host station and connected thereto via a PCM line, the switching unit comprising:
    at least one analog telephone line circuit for terminating an analog telephone subscriber line;
    at least one ISDN digital line circuit for terminating a digital terminal;
    a traffic concentrator switch connected to said telephone line circuit and said ISDN digital line circuit for concentrating traffics on said PCM line;
    processing means for controlling the remote switching unit; and
    signal converter means connected to said analog telephone line circuit and to said processing means and including a detector for detecting an on and off of a direct current in said subscriber line, a multifrequency signal receiver, a ring set circuit for transmitting a ringing signal to an analog telephone subscriber, a tone circuit for transmitting an audible tone signal to said analog telephone subscriber, and a controller;
    said converter means converting an off-hook signal, an on-hook signal, dial pulses and a multifrequency signal of said analog telephone subscribers into an ISDN-D channel protocol message to be transmitted to said processing means, and said converter means converting the ISDN-D channel protocol message from said processing means into the ringing signal and the audible tone signal for said analog telephone subscribers, wherein
    said processing means multiplexes the ISDN-D channel protocol messages from said ISDN digital line circuit and said converter means and transmits the messages to said host station via said PCM line, and said processing means demultiplexes the ISDN-D channel protocol messages received from said host station and transmits the ISDN-D channel protocol messages to said ISDN digital line circuit and said converter means.

2. An ISDN remote switching unit of claim 1, wherein a plurality of analog telephone line circuits are provided and said signal converter means is installed for each of the analog telephone line circuits.

3. An ISDN remote switching unit of claim 1, wherein a plurality of analog telephone line circuits are provided and said signal converter means is installed for the plurality of analog telephone line circuits.

4. An ISDN remote switching unit accommodating analog telephone subscribers and ISDN digital subscribers and disposed separately from a host station and connected thereto via a PCM line, the switching unit comprising:
    at least one analog telephone line circuit for terminating an analog telephone subscriber line;
    at least one ISDN digital line circuit for terminating a digital terminal;
    a traffic concentrator switch connected to said telephone line circuit and said ISDN digital line circuit for concentrating traffics on said PCM line;
    processing means for controlling the remote switching unit; and
    signal converter means connected via a semi-fixed path of said traffic concentrator switch to said analog telephone line circuit and also connected to said processing means and including a detector for detecting an on and off of a direct current in said subscriber line, a multifrequency signal receiver, a ring set circuit for transmitting a ringing signal to an analog telephone subscriber, a tone circuit for transmitting an audible tone signal to said analog telephone subscriber, and a controller;
    said converter means converting an off-hook signal, an on-hook signal, dial pulses and a multifrequency signal of said analog telephone subscribers into an ISDN-D channel protocol message to be transmitted to said processing means, and said converter means converting the ISDN-D channel protocol message from said processing means into the ringing signal and the audible tone signal for said analog telephone subscribers, wherein
    said processing means multiplexes the ISDN-D channel protocol messages from said ISDN digital line circuit and said converter means and transmits the messages to said host station via said PCM line, and said processing means demultiplexes the ISDN-D channel protocol messages received from said host station and transmits the ISDN-D channel protocol messages to said ISDN digital line circuit and said converter means.

* * * * *